United States Patent [19]

Rizzo

[11] Patent Number: 4,632,189

[45] Date of Patent: Dec. 30, 1986

[54] SOIL AERATING MACHINE

[76] Inventor: Salvatore J. Rizzo, 78 Arlington St., Meriden, Conn. 06450

[21] Appl. No.: 657,743

[22] Filed: Oct. 4, 1984

[51] Int. Cl.$^4$ .................. A01B 45/02; A01B 35/20
[52] U.S. Cl. .......................................... 172/22; 172/95
[58] Field of Search ................ 172/21, 22, 88, 95; 111/89

[56] References Cited

U.S. PATENT DOCUMENTS

| | | | |
|---|---|---|---|
| 1,413,910 | 4/1922 | Guerra y Marrero | 172/88 X |
| 1,477,097 | 12/1923 | Anderson et al. | 111/89 |
| 1,853,079 | 4/1932 | Plant | 172/21 UX |
| 1,939,897 | 12/1933 | Hill | 172/22 UX |
| 2,580,236 | 12/1951 | Mascaro | 172/21 |
| 3,171,498 | 3/1965 | Logan | 172/22 |
| 3,802,513 | 4/1974 | Ploenges | 172/21 |
| 3,878,899 | 4/1975 | Jones | 172/21 |
| 3,926,131 | 12/1975 | Collins | 172/21 X |
| 4,084,642 | 4/1978 | Killion | 172/21 |
| 4,154,305 | 5/1979 | Prewett | 172/21 |

FOREIGN PATENT DOCUMENTS

1347967 2/1974 United Kingdom .................. 172/21

Primary Examiner—Richard J. Johnson
Assistant Examiner—Terrence L. B. Brown
Attorney, Agent, or Firm—McCormick, Paulding & Huber

[57] ABSTRACT

A self-propelled lawn aerating machine includes a plurality of generally vertically reciprocally movable tines operated by a cam shaft for removing plugs of soil from a lawn. The tines are spring biased upwardly and in forward direction toward a bumper board located forward of the tines. When withdrawn from the lawn the tines strike the bumper board with sufficient force to break the soil plugs and cause the resulting loose soil to be scattered over the surface of the lawn as the machine moves along an aerating path. The bumper board has a raised position wherein it supports the tines in an idling position above the surface of the ground while the machine is moved across walkways, driveway, and the like.

11 Claims, 10 Drawing Figures

SOIL AERATING MACHINE

This invention relates in general to earth working apparatus and deals more particularly with an improved self-propelled soil aerating machine of the plug removing type particularly adapted for aerating a lawn or the like.

In recent years, the increasing demand for lawn care service has created need for improvements in lawn servicing machinery. Most lawn care programs provide for periodic application of liquid chemicals which increase lawn growth and thatch. Frequent aeration is required to assure efficient chemical penetration, if satisfactory results are to be attained.

Heretofore various lawn aerating machines have been provided which remove plugs of soil to form corred holes which expose top soil to air and moisture. However, the plug removing implements which comprise such machines generally tend to compress the soil around the holes formed by plug removal. The resulting compressed soil condition inhibits aeration, at least to some degree.

The plugs or cores produce by the aerating process contain microrganisms and nutrients generally beneficial to a lawn. However, the machines heretofore available usually deposit soil plugs intact upon the lawn to be broken at a later time as, for example, when the lawn is mowed, so that the immediate benefit of the microorganisms and soil nutrients is lost. In an instance where it is desirable to immediately break the formed plugs, a separate machine attachment is customarily provided for use with the lawn aerating machine.

It is the general aim of the present invention to provide an improved high speed, light weight aerating machine of simple, durable construction for aerating a lawn or the like by removing plugs of soil from the lawn. It is a further aim of the invention to provide an improved machine of the aforedescribed type which removes soil plugs without substantially compressing the surrounding soil and which breaks the plugs, when formed, and spreads the resulting loose soil on the lawn.

SUMMARY OF THE INVENTION

In accordance with the invention, an improved soil aerating machine comprises a frame supported to travel on the ground and along an aerating path, and an aerating mechanism mounted on the frame and including at least one vertically elongated tine supported at its upper end for a generally vertical movement between soil penetrating and raised positions and forward and rearward pivotal movement relative to the frame. An abutment surface forward of the one tine limits forward pivotal movement of the one tine, which is biased in forward direction and toward its raised position. Means is provided for driving the one tine downwardly from its raised position to its soil penetrating position as the machine advances along its aerating path.

DETAILED DESCRIPTION OF PREFERRED EMBODIMENT

Figure 1:
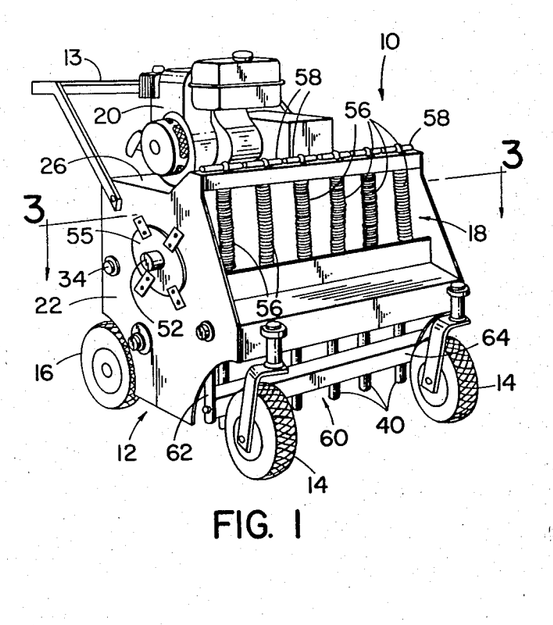
FIG. 1 is a perspective view of a lawn aerating machine embodying the present invention.
Figure 2:
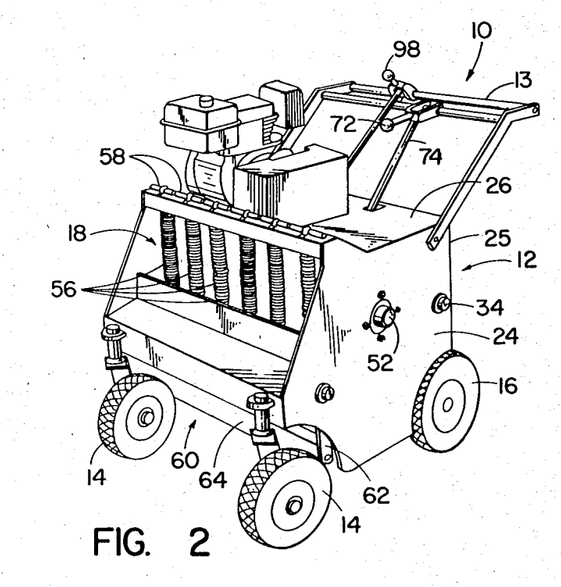
FIG. 2 is another perspective view of the lawn aerating machine shown in FIG. 1.
Figure 3:
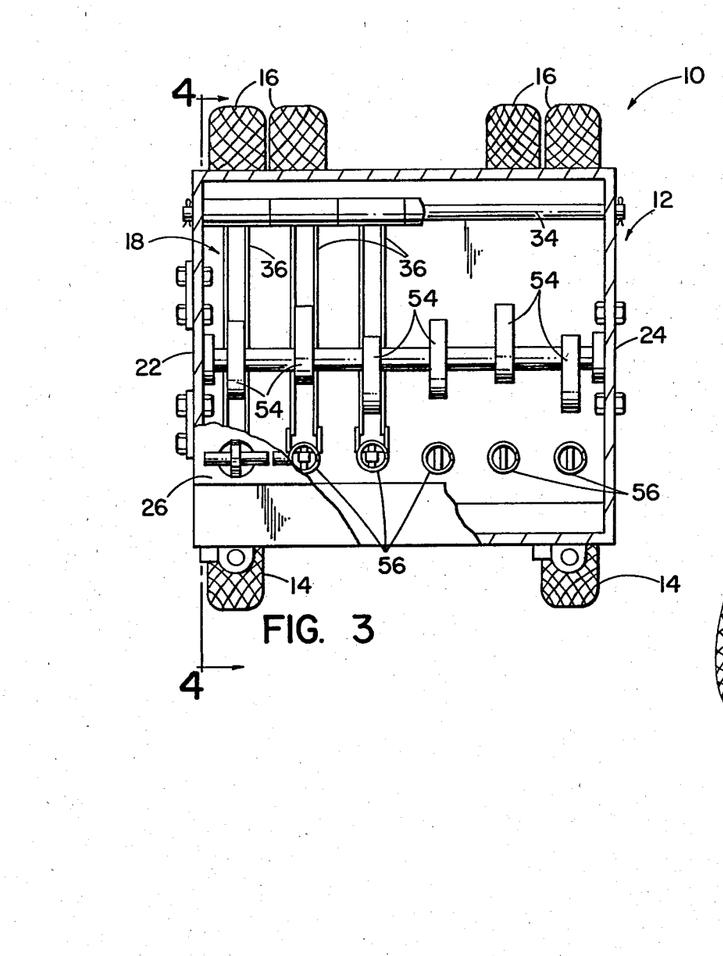
FIG. 3 is a somewhat enlarged sectional view taken generally along the line 3—3 of FIG. 1.

Turning now to the drawings, and referring first particularly to FIGS. 1 and 2, a self-propelled, walk-behind soil aerating machine, embodying the present invention and indicated generally by reference numeral 10, essentially comprises a frame, indicated generally at 12, provided with a handle 13 and supported by front wheels 14, 14 and rear wheels 16, 16 to travel on the ground and in a forward direction along a soil aerating path. The machine 10 further includes a soil aerating mechanism, supported on the frame 12, indicated generally by the reference numeral 18, and best shown in FIGS. 4–7. An internal combustion engine 20, mounted on the upper portion of the frame, drives the aerating machanism 18 to form cored holes in soil as the machine 10 advances along a soil aerating path. Preferably, and as shown, the engine 20 also drives at least one of the rear wheels 16, 16 to propel the machine along the ground.

Figure 10:
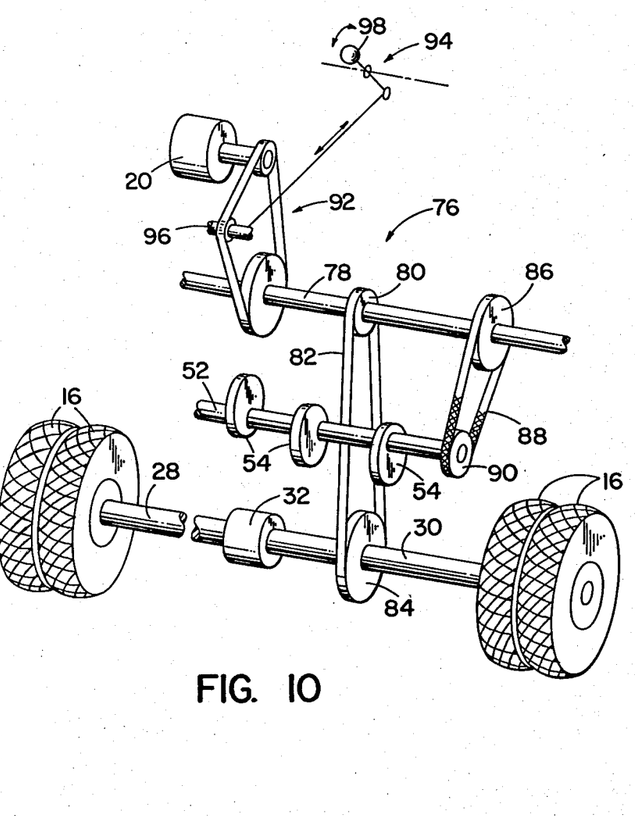
FIG. 10 is a somewhat schematic perspective view illustrating the aerating machine drive mechanism.

The construction and arrangement of the machine may vary. However, in the illustrated machine 10 the frame 12 comprises a generally rectangular weldment which includes vertically disposed and transversely spaced apart right and left side walls 22 and 24, a rear wall 25, and a horizontally disposed top wall 26 connected to and extending between the upper ends of the side walls. The rear wheels 16, 16 are mounted on separate axles, 28 and 30 journalled for rotation on the frame and connected together by a differential drive unit 32, as shown in FIG. 10. The differential drive unit 32 allows the wheels to rotate at differing speeds relative to each other. The front wheels 14, 14 are mounted on the frame to swivel relative to the frame and independently of each other and are vertically adjustable, as will be hereinafter further discussed.

The aerating mechanism 18 includes a generally horizontally disposed rocker arm shaft 34, which is supported at its opposite ends by the side walls 22 and 24 and extends transversely therebetween. A plurality of substantially identical rocker arms 36, 36 pivotly supported on the rocker arm shaft 34 extend forwardly therefrom in transversely spaced relation to each other. The number of rocker arms may vary, however, the illustrated machine 10 has six rocker arms 36, 36. A roller follower 38 is journalled on each rocker arm intermediate the ends of the rocker arm for rotation about an axis parallel to the axis of the rocker arm shaft 34. The aerating apparatus 18 further includes a plurality of tines 40, 40 equal in number to said rocker arms 36, 36. Each tine 40 is pivotally connected to the forward end of an associated rocker arm 36 by a pivot pin 41 to move generally vertically between a soil penetrating position, shown in FIG. 4, and a raised position, shown in FIG. 6, in response to rocking movement of its associated rocker arm 36.

Figure 8:
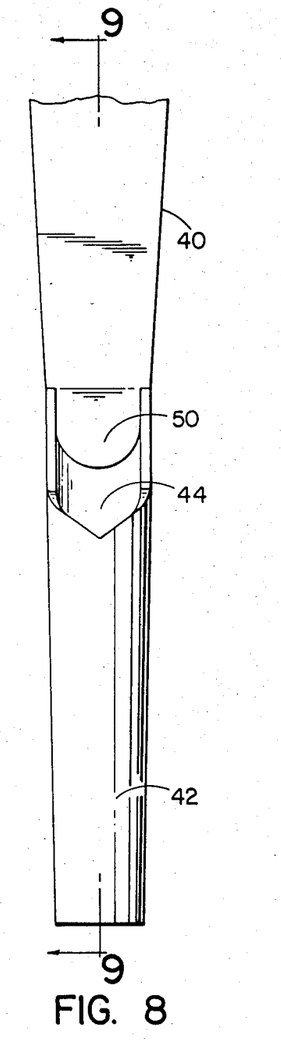
FIG. 8 is a somewhat further enlarged fragmentary rear elevational view of the soil penetrating portion of a typical time.
Figure 9:
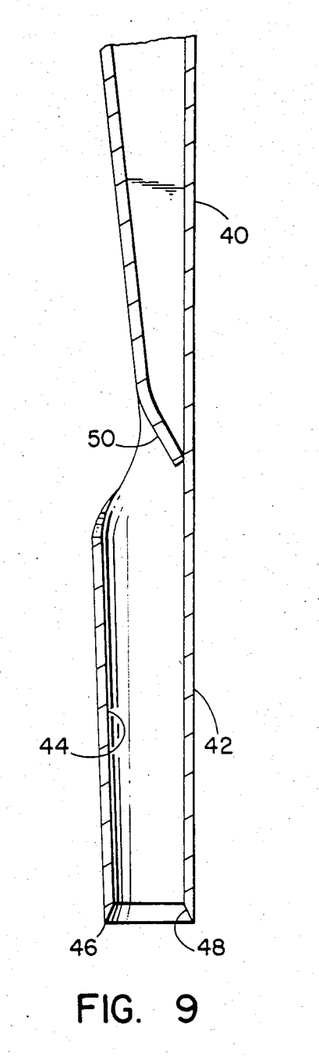
FIG. 9 is a fragmentary sectional view taken along the line 9—9 of FIG. 8.

Each tine 40 is preferably formed from sheet metal and has a generally tubular soil penetrating portion 42 at its lower end, as best shown in FIGS. 8 and 9. The soil penetrating portion has a slightly tapered bore 44, which is preferably generally cylindrical and opens through the upper and lower ends of the soil penetrating portion. The lower end of the soil penetrating portion 42 terminates at a sharp peripheral edge 46 defined by the junction of the outer peripheral surface of the soil penetrating portion and a generally conical outwardly diverging lower end portion of the bore, indicated by the numeral 48. An upwardly and rearwardly inclined guide surface 50 is formed on the tine 40 immediately above the soil penetrating portion 42, substantially as shown.

The rocker arms are driven by a cam shaft 52 which carries a plurality of cams 54, 54 and which is journalled at its opposite ends on the side walls 22 and 24 and extends therebetween in generally parallel relation to the rocker arm shaft 34. One end of the cam shaft 52 is journalled in a bearing fastened to the side wall 24. The other end of the cam shaft is journalled in another bearing fastened to a removable plate 55, which is releasably secured to and forms a part of the side wall 22, as shown in FIG. 1. Removal of the plate 55 exposes an opening in the sidewall 22, through which the cam shaft 52 and cams 54, 54 may freely pass.

The cams 54, 54 are generally circular and mounted in fixed position on and in eccentric relation to the cam shaft 52. Each cam 54 engages the roller follower 38 on an associated rocker arm 36. Preferably, and as shown, the cams 54, 54 are angularly offset relative to each other about the axis of the cam shaft 52 to move the rocker arms 36, 36 in timed relation to each other, so that the tines 40, 40 penetrate the soil at different times.

Each rocker arm 36 is individually biased toward the cam shaft 52 by a spring 56 connected to an associated tine 40 mounted on the rocker arm. More specifically, the lower end of each spring 56 is connected to an asociated tine 40 forward of the axis of its pivot pin 41. The upper end of each spring is anchored on the top wall 26. A loop on the upper end of each spring extends through an associated opening in the top wall 26 and is retained by a short pin 58 which extends through the loop and bears against the upper surface of the top wall 26. It will now be apparent that the spring 56, 56 also serve to bias the lower ends or soil penetrating portions 42, 42 of the tines about the pivot pins 41, 41 and in forward direction. The purpose of this arrangement will be hereinafter further evident.

A striker or bumper board assembly, indicated generally at 60, limits forward pivotal movement of the tines 40, 40 and maintains the tines in generally vertically orientated positions during movement between raised and soil penetrating positions. The bumper board assembly 60 also serves to maintain the tines in an idling position, shown in FIG. 7, when the machine is being moved under power over ground which is not to be aerated, as, for example, walkways, driveways and the like. In the latter position the tines remain in motion, but do not enter the ground.

The bumper board assembly 60 essentially comprises a pair of transversely spaced side members 62, 62, respectively pivotally supported on the side walls 22 and 24. A generally U-shaped channel member 64 is connected to and extends between the lower ends of the side member 62, 62 forward of the soil penetrating portions 42, 42 and supports an insert or bumper board 66, which is preferably made from hard wood and which defines a generally rearwardly facing abutment surface 68. The side members 62, 62 are further connected together by a cross member 70 which extends transversely therebetween intermediate the ends of the side members. A control lever 72, pivotally supported on the handle 13 and connected to the cross member 70 by a control link 74, pivots the bumper board assembly between a lowered position, shown in FIGS. 1 and 2 and 4–6, and a raised position, shown in FIG. 7, and maintains the bumper board assembly in either its raised or its lowered position.

Referring now to FIG. 10, the drive mechanism for the machine 10, illustrated somewhat schematically and indicated generally at 76, includes a main drive shaft 78 journalled on the machine frame 12. A drive sprocket 80 mounted in fixed position on the main drive shaft is connected by a drive chain 82 to another sprocket 84 keyed to the axle 30. Another drive sprocket 86 secured to the main drive shaft 78 is connected by another drive chain 88 to still another sprocket 90 keyed to the cam shaft 52. A V-belt drive, indicated generally at 92, drivingly connects the main drive shaft 78 to the engine 20. A belt tensioning mechanism, indicated generally at 94, which includes a belt tensioner 96 and a belt tensioning lever 98 connected to the belt tensioner moves the V-belt between slack and drive positions relative to the main drive shaft 78, in a manner well known in the art.

Preparatory to operating the machine 10 the belt tensioning level 98 is placed in belt slack position to enable the engine 20 to be started under no load condition. The bumper board assembly 60 is preferably in its raised position, as it appears in FIG. 7. The engine starter arrangement may vary, however, the illustrated engine is provided with a pull-rope starter of a well known type.

After the engine has been started and is running at a low speed, the belt tensioning lever 98 is moved to its belt tensioning or driving position to engage the engine drive and rotate the main drive shaft 78, which turns the rear wheels 16, 16 to propel the machine in forward direction. When the machine is in aerating position, the control level 72 is operated to move the bumper board assembly 60 from its raised position to its lowered position, thereby lowering the tines 40, 40. The engine speed may now be increased, as desired, by operating a conventional speed control associated with the engine, but not shown.

Figure 4:
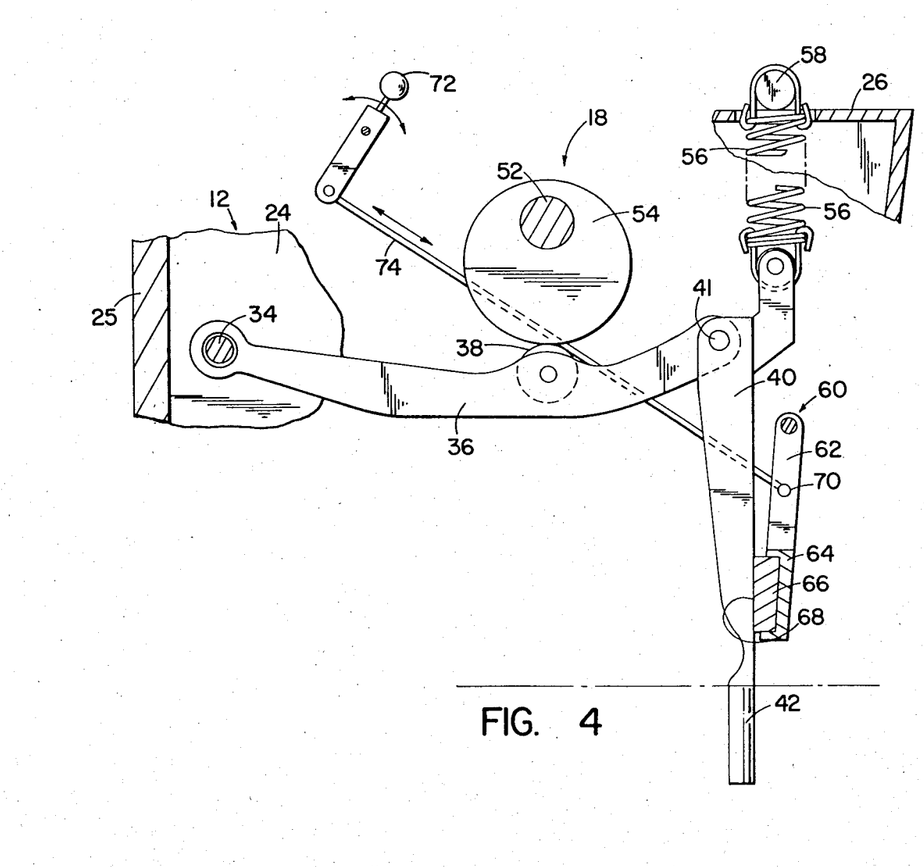
FIG. 4 is a somewhat further enlarged fragmentary sectional view taken along the line 4—4 of FIG. 3 and showing a tine in a soil penetrating position, parts of the machine being omitted for clarity of illustration.
Figure 5:
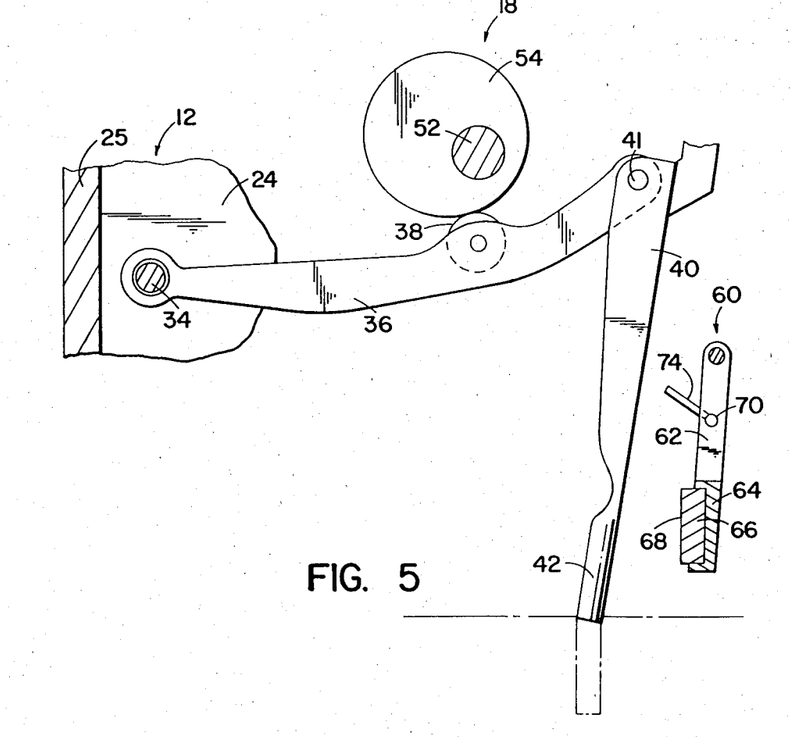
FIG. 5 is similar to FIG. 4, but shows the tine in another position.

Each tine 40 is disposed in a generally vertical position as it enters the ground (FIG. 4). Since the machine is advancing along an aerating path each tine 40 will pivot about its pivot pin 41 in a rearward direction against the oppositioning biasing force exerted by its associated spring 56 as the machine 10 advances with the tine in penetrating relation to the ground. As each tine enters the ground, a generally cylindrical plug of soil is forced upwardly into its soil penetrating portion 42. It should be noted that the soil plug will be compressed as it is forced upwardly through the downwardly conically diverging bore portion 48 and into the main portion of the bore 44. Thus, the tine does not tend to compress the soil surrounding the cored hole which it forms.

Figure 6:
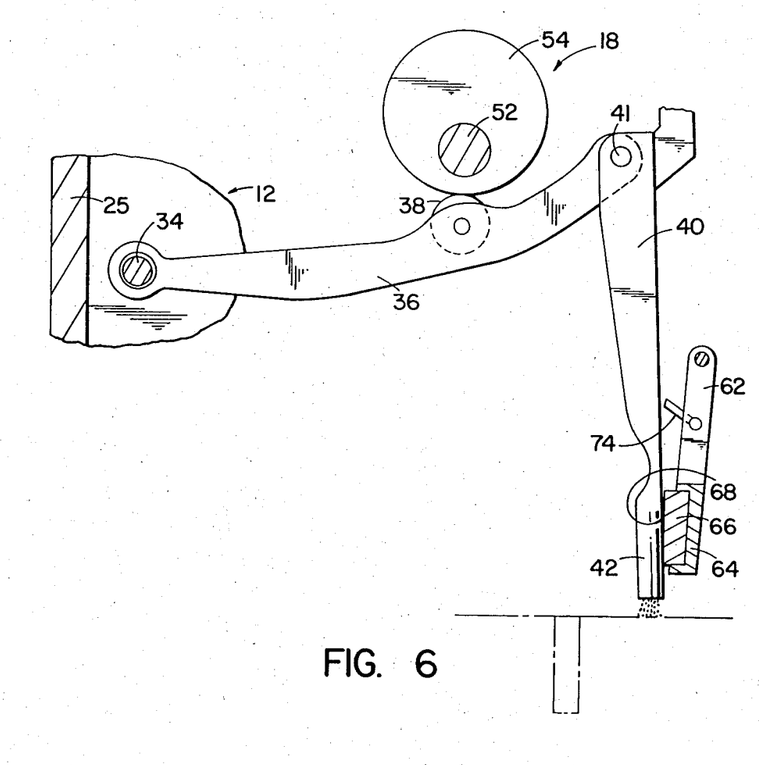
FIG. 6 is also similar to FIG. 4, but shows the tine in a raised position.
Figure 7:
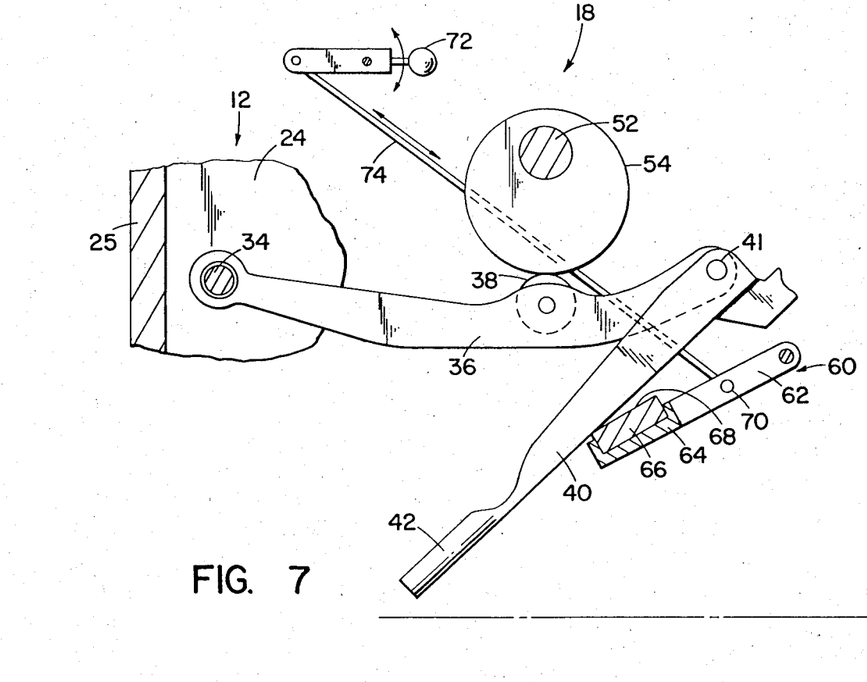
FIG. 7 is also similar to FIG. 4, but shows the tine in an idling position.

As the tine is withdrawn from the ground (FIG. 5) by the cooperating action of the cam shaft 52 and its associated biasing spring 56 the tine will abruptly snap in a forward direction under the biasing force of the spring 56 causing its soil penetrating portion 42 to abruptly strike the abutment surface 68 on the bumper board assembly with considerable force (FIG. 6). Under most soil conditions, this violent action is sufficient to break the soil plug carried by the tine and cause the resulting loose soil to be scattered on the surface of the lawn as the machine 10 advances along its aerating path.

In the presently preferred machine 10 the tines 40, 40 are constructed and arranged for 2¾ inch earth penetration. However, the depth of penetration may be adjusted by adjusting the position of the front wheels 14, 14 relative to the machine frame 12.

The illustrated six tine machine 10 travels at a rate of approximately 2½ miles per hour and is capable of raising approximately 1½ cubic yards of soil per 10,000 square feet of lawn while coring up to 30,000 square feet of lawn per hour.

The simple construction of the machine facilitates servicing and allows rapid part replacement, if necessary. Each tine spring 56 is connected to the machine frame 12 by an associated pin 58 and may be removed by removing the latter pin and the pivot pin 41 which connect it to the tine.

The cam shaft 52 may be readily removed for servicing by simply removing the fasteners which secure the plate 55 to the remaining portion of the side wall 22. The cam shaft may then be readily removed through the opening in the side wall 22 exposed by removal of the plate. Access to the rocker arms is provided by removing a cotter key from one end of the rocker arm shaft 34 so that the latter shaft may be pulled through opposite side of the machine to allow removal of the individual rocker arms 36, 36, as necessary.

I claim:

1. A soil aerating machine having a frame, means for supporting said frame to travel on the ground and advance along an aerating path, and a soil aerating mechanism supported on said frame and including a horizontally disposed cam shaft having as axis extending transversely of said path, a rocker arm shaft having an axis parallel to said cam shaft axis, a plurality of rocker arms, each rocker arm being supported by said rocker arm shaft for rocking movement relative to the axis of said rocker arm shaft and projecting forwardly from said rocker arm shaft, a plurality of vertically disposed tines equal in number to said rocker arms, each of said tines having a tubular soil penetrating portion at its lower end and being pivotally connected about a tine pivot axis to the forward end of an associated rocker arm for forward and rearward pivotal movement relative to said associated rocker arm and for generally vertical reciprocal movement between raised and soil penetrating positions in response to rocking movement of said associated rocker arm, a plurality of cams equal in number to said rocker arms and mounted in fixed position along said cam shaft, each of said cams being engageable with an associated one of said rocker arms, spring means for biasing said rocker arms into engagement with said cams and for biasing said tines in a forward direction, abutment means forward of said tines for striking engagement by said tines and drive means for rotating said cam shaft to move said tines between said raised and said soil penetrating positions, each of said tines upon entering the ground in moving from said raised position to its soil penetrating position being pivotally moved about said tine pivot axis and in a rearward direction to a rear position spaced a substantial distance rearward from said abutment surface in reponse to movement of said machine in a forward direction and along said aerating path, each of said tines upon leaving the ground in moving toward its raised position being abruptly pivoted in a forward direction by said biasing means into striking engagement with said abutment means to dislodge soil from said tubular soil penetrating portion thereof.

2. A soil aerating machine as set forth in claim 1 wherein said means for supporting said frame comprises a plurality of wheels mounted on said frame and said means for rotating said cam shaft comprises means for driving at least one of said wheels.

3. A soil aerating machine as set forth in claim 1 wherein said means for biasing said rocker arms comprises said means for biasing said tines.

4. A soil aerating machine as set forth in claim 3 wherein said biasing means comprises a plurality of springs equal in number to said rocker arms, each of said springs being connected between said frame and an associated one of said tines.

5. A soil aerating machine as set forth in claim 4 wherein each of said springs is connected to an associated one of said tines forward of the pivotal connection between said one tine and said rocker arm connected to said one tine.

6. A soil aerating machine as set forth in claim 1 wherein said abutment means is defined by a bumper board supported on the frame for movement between a lowered position wherein said tines are disposed in generally vertical position for movement between said raised and soil penetrating positions and an elevated position wherein said tines are supported by said bumper board for reciprocal idling movement above the surface of the ground.

7. A soil aerating machine as set forth in claim 6 including means for moving said bumper board to and maintaining it in said raised position and said lowered position.

8. A soil aerating machine comprising a frame, means for supporting said frame to travel on the ground and advance in a forward direction along an aerating path, and an aerating mechanism mounted on a frame and including a horizontally disposed rocker arm shaft extending generally transversely of said path, a transversely spaced apart series of rocker arms supported by said rocker arm shaft to pivot about the axis of said rocker arm shaft and extending from said rocker arm shaft in the general direction of said path, a plurality of tines equal in number to said rocker arms, each of said tines being pivotally connected to an associated one of said rocker arms about a tine pivot axis and depending from said associated one of said rocker arms about its tine pivot axis, each of said tines having a tubular soil penetrating portion, a bumper board disposed in the path of pivotal movement of each of said tines relative to its associated rocker arm, means for alternately moving said tines between soil penetrating and raised positions and including a cam shaft and a plurality of cams equal in number to said rocker arms and mounted in fixed position on said cam shaft, each of said cams being engageable with an associated one of said rocker arms, spring biasing means for urging said rocker arms toward engagement with said cams and said tines toward engagement with said bumper board, and means for rotating said cam shaft to move said rocker arms, each of said tines upon entering the ground in moving from said raised position to said soil penetrating position being pivotally moved about its tine pivot axis and in a rearward direction to a rear position spaced a substantial distance rearward from said abutment surface in response to movement of said machine in a forward direction and along said aerating path, each of said tines upon leaving the ground in moving toward its raised position being abruptly pivoted by said spring biasing means in a forward direction and into striking engagement with said abutment surface to dislodge soil from said tubular soil penetrating portion.

9. A soil aerating machine as set forth in claim 8 wherein said tubular earth penetrating portion has a generally cylindrical bore and a generally cylindrical outer surface and a relatively sharp lower edge defined in part by said cylindrical outer surface.

10. A soil aerating machine as set forth in claim 9 wherein said lower edge is further defined by a downwardly diverging portion of said bore.

11. A soil aerating machine as set forth in claim 10 wherein said tubular soil penetrating portion is open at its upper end.

* * * * *